(12) United States Patent
Cheng et al.

(10) Patent No.: US 9,635,270 B2
(45) Date of Patent: *Apr. 25, 2017

(54) METHOD FOR PERFORMING IMAGE CONTROL IN AN ELECTRONIC DEVICE, AND ASSOCIATED APPARATUS

(71) Applicant: MEDIATEK INC., Hsin-Chu (TW)

(72) Inventors: Chia-Ming Cheng, Hsinchu (TW); Po-Hao Huang, Kaohsiung (TW); Yuan-Chung Lee, Tainan (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/218,069

(22) Filed: Jul. 24, 2016

(65) Prior Publication Data

US 2016/0337603 A1    Nov. 17, 2016

Related U.S. Application Data

(63) Continuation of application No. 14/599,550, filed on Jan. 19, 2015, now Pat. No. 9,426,386.

(51) Int. Cl.
*H04N 5/222* (2006.01)
*H04N 5/232* (2006.01)
*H04N 5/225* (2006.01)
*H04N 5/355* (2011.01)

(52) U.S. Cl.
CPC ....... *H04N 5/23293* (2013.01); *H04N 5/2257* (2013.01); *H04N 5/23212* (2013.01); *H04N 5/23229* (2013.01); *H04N 5/355* (2013.01)

(58) Field of Classification Search
CPC ......... G09G 3/2003; G09G 2340/0407; G09G 2300/0452; G09G 2320/0276; G09G 2340/0414; G09G 2340/0421; G09G 2340/0457; G09G 2320/0261; G09G 2320/0666; G09G 3/3426; H04N 21/4728; H04N 7/0152
See application file for complete search history.

(56) References Cited

U.S. PATENT DOCUMENTS

| | | | |
|---|---|---|---|
| 2003/0090497 A1 | 5/2003 | Yoshioka | |
| 2006/0176376 A1 | 8/2006 | Dyke | |
| 2007/0263112 A1 | 11/2007 | Shinkai | |
| 2009/0027515 A1 | 1/2009 | Maruyama | |
| 2011/0187914 A1 | 8/2011 | Lee | |
| 2011/0249961 A1* | 10/2011 | Brunner | H04N 5/23216 396/213 |
| 2014/0365310 A1* | 12/2014 | Movellan | G06Q 30/0269 705/14.66 |

* cited by examiner

*Primary Examiner* — Trung Diep
(74) *Attorney, Agent, or Firm* — Winston Hsu; Scott Margo (57) ABSTRACT

A method for performing image control in an electronic device and an associated apparatus are provided, where the method may include the steps of: obtaining a specific image from a camera module of the electronic device, and obtaining a specific focus-related parameter corresponding to the specific image, wherein the specific focus-related parameter is related to focus control of the camera module; determining a specific resize parameter corresponding to the specific image according to a relationship between the specific resize parameter and the specific focus-related parameter; and performing a resize operation on the specific image according to the specific resize parameter, to control the specific image to be displayed in a quasi-scale-invariant manner.

20 Claims, 9 Drawing Sheets

METHOD FOR PERFORMING IMAGE CONTROL IN AN ELECTRONIC DEVICE, AND ASSOCIATED APPARATUS

CROSS REFERENCE TO RELATED APPLICATION

This application is a continuation application and claims the benefit of U.S. Non-provisional application Ser. No. 14/599,550, which was filed on 2015 Jan. 19, and is included herein by reference.

BACKGROUND

The present invention relates to camera control in a portable electronic device such as a multifunctional mobile phone, and more particularly, to a method for performing image control in an electronic device, and an associated apparatus.

Autofocus procedure of a camera device changes the scale of captured content with respect to focus settings. In a situation where the preview images are displayed during a convention autofocus procedure of the conventional portable electronic device, the scale of captured content varies with respect to focus settings, since the focus distance, i.e. between the camera lens and the image sensor, varies with focus settings in response to the autofocus procedure. As a result, staring at the preview frames that are scale-variant in the related mechanism, a user may feel visually annoyed that leads to dissatisfied user experience. To this end, we propose a novel architecture to enhance the overall performance of an electronic device without introducing other side effects.

SUMMARY

It is therefore an objective of the claimed invention to provide a method for performing image control in an electronic device, and an associated apparatus, in order to solve the above-mentioned problems.

It is another objective of the claimed invention to provide a method for performing image control in an electronic device, and an associated apparatus, in order to enhance the overall performance of the electronic device without introducing any side effect.

According to at least one preferred embodiment, a method for performing image control in an electronic device is provided, where the method comprises the steps of: obtaining a specific image from a camera module of the electronic device, and obtaining a specific focus-related parameter corresponding to the specific image, wherein the specific focus-related parameter is related to focus control of the camera module; determining a specific resize parameter corresponding to the specific image according to a relationship between the specific resize parameter and the specific focus-related parameter (e.g. the mapping of the specific resize parameter and the specific focus-related parameter associated with the specific resize parameter); and performing a resize operation (e.g. an image resize operation) on the specific image according to the specific resize parameter, to control the specific image to be displayed in a scale-invariant manner. In some embodiments, the scale-invariant manner may be replaced by a quasi-scale-invariant manner, and this quasi-scale-invariant manner may represent that a difference between a scale of the specific image and a scale of another image (e.g. any of a plurality of other images) falls within a range.

According to at least one preferred embodiment, an apparatus for performing image control in an electronic device is also provided, where the apparatus comprises at least one portion of the electronic device. The apparatus comprises a focus control module and a resize control module that is coupled to the focus control module, and further comprises an image resize module that is coupled to the resize control module. More particularly, the focus control module is arranged for controlling the apparatus to obtain a specific image from a camera module of the electronic device, and is further arranged for obtaining a specific focus-related parameter corresponding to the specific image, wherein the specific focus-related parameter is related to focus control of the camera module. In addition, the resize control module is arranged for determining a specific resize parameter corresponding to the specific image according to a relationship between the specific resize parameter and the specific focus-related parameter (e.g. the mapping of the specific resize parameter and the specific focus-related parameter). Additionally, the image resize module is arranged for performing a resize operation (e.g. an image resize operation) on the specific image according to the specific resize parameter, to control the specific image to be displayed in a scale-invariant manner. In some embodiments, the scale-invariant manner may be replaced by a quasi-scale-invariant manner, and this quasi-scale-invariant manner may represent that a difference between a scale of the specific image and a scale of another image (e.g. any of a plurality of other images) falls within a range.

According to at least one preferred embodiment, a method for performing image control in an electronic device is provided, where the method comprises the steps of: obtaining a specific image from a camera module of the electronic device, and obtaining a specific focus-related parameter corresponding to the specific image, wherein the specific focus-related parameter is related to focus control of the camera module; determining a specific resize parameter corresponding to the specific image according to a relationship between the specific resize parameter and the specific focus-related parameter (e.g. the mapping of the specific resize parameter and the specific focus-related parameter associated with the specific resize parameter); and performing a resize operation (e.g. an image resize operation) on the specific image according to the specific resize parameter, to control the specific image to be displayed in a quasi-scale-invariant manner. For example, this quasi-scale-invariant manner may represent that an image scale difference between the specific image and another image (e.g. any of a plurality of other images) falls within a range.

It is an advantage of the present invention that the present invention method and the associated apparatus can enhance the overall performance of the electronic device without introducing any side effect. In addition, in comparison with the related art, the present invention method and the associated apparatus can bring better user experience, where the potential problems of related art can be prevented.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
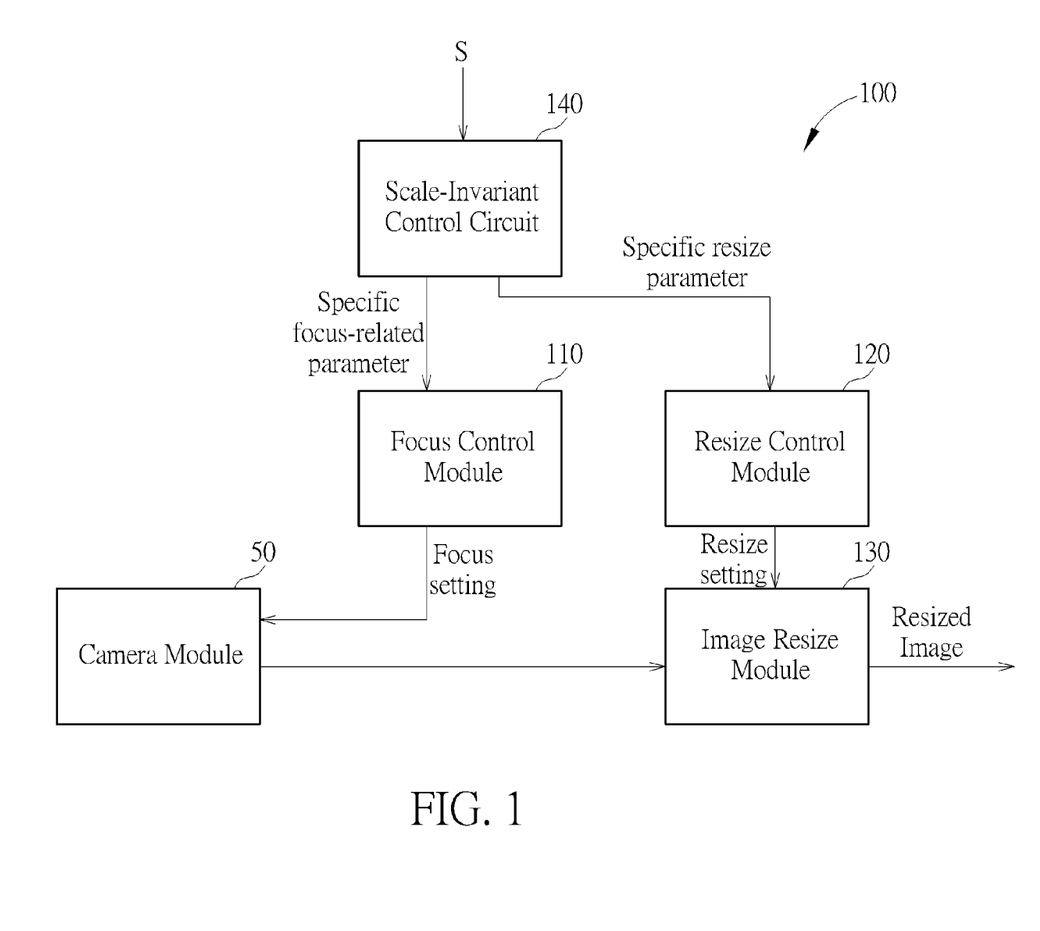
FIG. 1 is a diagram of an apparatus for performing image control in an electronic device according to an embodiment of the present invention.

FIG. 1 is a diagram of an apparatus 100 for performing image control in an electronic device according to an embodiment of the present invention, where the apparatus 100 may comprise at least one portion (e.g. a portion or all) of the electronic device. For example, the apparatus 100 may comprise a portion of the electronic device mentioned above, and more particularly, can be at least one hardware circuit such as at least one integrated circuit (IC) within the electronic device. In another example, the apparatus 100 can be the whole of the electronic device mentioned above. In another example, the apparatus 100 may comprise a system comprising the electronic device mentioned above (e.g. an audio/video system comprising the electronic device). Examples of the electronic device may include, but not limited to, a digital camera, a mobile phone (e.g. a multi-functional mobile phone), a personal digital assistant (PDA), and a personal computer such as a laptop computer.

As shown in FIG. 1, the apparatus 100 may comprise a focus control module 110, a resize control module 120, and an image resize module 130, where the focus control module 110 and the resize control module 120 are coupled to a scale-invariant control circuit 140, and the image resize module 130 is coupled to the resize control module 120. More particularly, the focus control module 110 is arranged for enabling the apparatus 100 to obtain a specific preview image from a camera module 50 of the electronic device, and the focus control module 110 is further arranged for setting a specific focus-related parameter corresponding to the specific preview image. The specific focus-related parameter from the scale-invariant control circuit 140 is related to focus control of the camera module 50. The focus control module 110 may apply at least one focus setting (e.g. one or more focus settings) to the camera module 50, and the camera module 50 gets the specific preview image based on the focus setting, wherein the specific preview image can be derived from a user using the apparatus 100 (such as a digital camera) to take a photo.

In addition, the scale-invariant control circuit 140 is arranged for determining a specific resize parameter corresponding to the specific preview image according to a predetermined relationship between the specific resize parameter and the specific focus-related parameter, Thus, the resize control module 120 may apply at least one resize setting to the image resize module 130 according to the specific resize parameter.

The image resize module 130 is arranged for performing a resize operation on the specific preview image according to the resize setting, to control the specific preview image to be displayed in a scale-invariant manner with respect to a plurality of preview images, where the preview images are obtained from the camera module 50, and the preview images comprise the specific preview image. As a result, the resized images are generated and output by the image resize module 130.

In practice, the signal S shown in FIG. 1 may carry at least one focus control result, which may come from either automatic or manual focus process of the camera module 50, which is the input to the scale-invariant control circuit 140 for the aforementioned scale-invariant manner. Autofocus process sets the signal to obtain a series of preview images of different focus settings and perform autofocus statistics analysis to get the best focused image. Manual-focus control signal corresponding to at least one user input can be obtained from a user interface (UI) of the electronic device (e.g. a set of physical buttons of the electronic device, or a set of virtual buttons displayed on a touch display module of the electronic device). This is for illustrative purposes only, and is not meant to be a limitation of the present invention.

Please note that the apparatus 100 may comprise the camera module 50 mentioned above, for example. In some examples, the camera module 50 can be positioned outside the apparatus 100, where the camera module 50 can be coupled to the apparatus 100 in these examples.

According to some embodiments, the resize control module 120 can be integrated into the focus control module 110. According to other embodiments, it is unnecessary that the resize control module 120 is integrated into the focus control module 110.

The focus control module 110, the resize control module 120, and the image resize module 130 can be positioned within an image signal processor (ISP) (not shown), where the ISP can be coupled to the camera module 50. According to some embodiments, it is unnecessary that all of the focus control module 110, the resize control module 120, and the image resize module 130 are positioned within an ISP.

The camera module 50 may comprise a lens unit, an image sensor, and an autofocus actuator that are arranged for obtaining the specific preview image, where the focus control module 110, the resize control module 120, and the image resize module 130 can be integrated into the image sensor. For example, the lens unit may comprise a single lens. In some examples, the lens unit may comprise a set of lenses. An autofocus actuator is used to adjust the image distance, i.e. the distance between the lens and the sensor to converge light to the sensor plane so as to obtain a sharp image. Current producible actuators may include voice coil motor, piezoelectric actuator autofocus, stepper motor, and MEMS (microelectromechanical systems)-based autofocus actuators.

There is an autofocus control circuit (not shown in FIG. 1) arranged for performing the aforementioned autofocus control of the camera module 50, and there is an autofocus statistics module (not shown in FIG. 1), where the autofocus control circuit can be coupled between the camera module 50 and the scale-invariant control circuit 140. More particularly, the autofocus statistics module is arranged for performing a plurality of autofocus statistics operations on the plurality of preview images to generate a plurality of autofocus statistics results, respectively, for use of the aforementioned autofocus control. This is for illustrative purposes only, and is not meant to be a limitation of the present invention.

Figure 2:
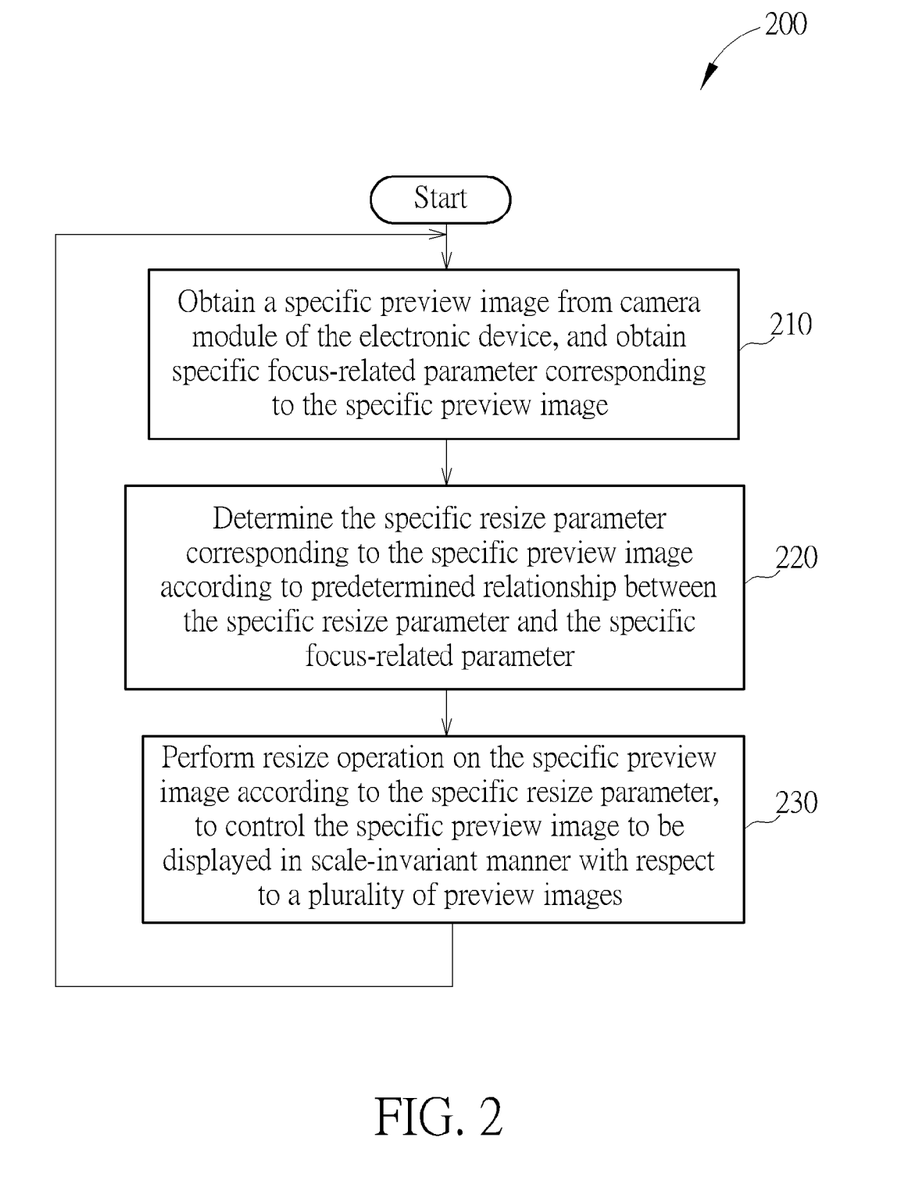
FIG. 2 illustrates a flowchart of a method for performing image control in an electronic device according to an embodiment of the present invention.

FIG. 2 illustrates a flowchart of a method 200 for performing image control in an electronic device according to an embodiment of the present invention. The method 200 can be applied to the apparatus 100 shown in FIG. 1, and can be applied to the focus control module 110, the resize control module 120, and the image resize module 130 thereof. The method can be described as follows.

In Step 210, the focus control module 110 controls the apparatus 100 to obtain a specific preview image from the camera module 50 of the electronic device, and obtains the specific focus-related parameter corresponding to the specific preview image, where the specific focus-related parameter is related to the focus control of the camera module 50.

In Step 220, the resize control module 120 determines the specific resize parameter corresponding to the specific preview image according to the predetermined relationship between the specific resize parameter and the specific focus-related parameter.

In Step 230, the image resize module 130 performs the resize operation on the specific preview image according to the specific resize parameter, to control the specific preview image to be displayed in the scale-invariant manner with respect to a plurality of preview images (i.e. other preview images).

In other embodiments, the manner to eliminate user's visually annoyed feeling could also be implemented by that a difference between the scale of the specific preview image and the scale of any preview image (e.g. any of the plurality of preview images mentioned in Step 230) falls within a range of a predetermined interval. Namely, the difference between the scales of the specific preview image and any preview image (e.g. any of the plurality of preview images) may fall in an allowed range rather than just equal to zero. The manner this way can be seen as a quasi-scale-invariant manner.

In practice, the specific focus-related parameter can be an autofocus control parameter that is utilized for performing the aforementioned autofocus control on the camera module 50, for example. More particularly, the specific focus-related parameter can be a digital value to be applied to a digital-to-analog converter (DAC), where the DAC can be positioned on a control path of the camera module 50. For example, the camera module 50 may comprise a lens unit and an image sensor, where the lens unit and the image sensor are arranged for obtaining the specific preview image. In addition, the camera module may further comprise a motor that is arranged for changing the distance between the lens unit and the image sensor, where the digital value applied to the DAC is utilized for controlling the motor.

According to some embodiments, the specific focus-related parameter is associated to an autofocus status of the camera module 50. For example, the autofocus status may represent the distance between the lens unit and the image sensor in the above embodiments. In some examples, the autofocus status may represent a certain control position of the motor. In other examples, the autofocus status may represent a DAC index, such as the digital value.

The preview images can be displayed in the scale-invariant manner, and the focus control module 110 may control the apparatus 100 to set the focus-related parameters to obtain the preview images of the specific focus setting, respectively, where the focus-related parameters comprises the specific focus-related parameter. In addition, the resize control module 120 may determine the resize parameters corresponding to the preview images according to the predetermined relationships between the resize parameters and the focus-related parameters, respectively, where the resize parameters comprise the specific resize parameter. More particularly, the image resize module 130 may perform a plurality of resize operations on the preview images according to the resize parameters, respectively, to control the preview images to be displayed in the scale-invariant manner.

Please note that, typically, both of the displayed version of the specific preview image and the displayed version of another preview image may have the same object. For the object shown in both of the displayed versions of the specific preview image and the other preview image, the size and the position of the object are invariant. More particularly, all of the preview images may have the same image contents, except that at least one portion (e.g. a portion or all) of the preview images may be not clear enough (e.g. one or more preview images may look vague) due to failure of imaging.

In one embodiment, the resize control module 120 may obtain the predetermined relationship between the specific resize parameter and the specific focus-related parameter from a look up table (LUT). More particularly, different portions of the LUT, such as a plurality of partial LUTs within the LUT, may indicate the predetermined relationships between the resize parameters and the focus-related parameters, respectively. As a result, the resize control module 120 may obtain any predetermined relationship of the predetermined relationships from the LUT.

In another embodiment, the resize control module 120 may obtain the aforementioned predetermined relationship between the specific resize parameter and the specific focus-related parameter from a predetermined model according to a set of predetermined data. For example, the resize control module 120 may obtain the set of predetermined data from a LUT, where this LUT can be the same as a partial LUT within the plurality of partial LUTs mentioned in the above embodiment. As a result, the resize control module 120 may obtain some predetermined relationships from this LUT, and may obtain other predetermined relationships from the predetermined model according to the set of predetermined data since the other predetermined relationships can be derived by performing model fitting of the predetermined model according to the set of predetermined data.

The resize control module 120 may perform a plurality of learning operations according to a set of preview images (e.g. multiple preview images that are different from the preview images mentioned in Step 230, such as some other preview images obtained in advance by using the camera module 50), to generate a plurality of learning results, respectively, in advance. In addition, the resize control module 120 may obtain the predetermined relationship between the specific resize parameter and the specific focus-related parameter from a predetermined model according to a specific learning result. For example, the resize control module 120 may determine the learning results by statistics model fitting. In some examples, the resize control module 120 may obtain a plurality of user inputs from a UI of the electronic device (e.g. a set of physical buttons of the electronic device, or a set of virtual buttons displayed on a touch sensitive display module of the electronic device), where the user inputs corresponds to the set of preview images, respectively. More particularly, the resize control module 120 may perform the learning operations according to the set of preview images and the user inputs to generate the learning results, respectively, in advance. As a result, the resize control module 120 may obtain the predetermined relationships from the predetermined model according to an associated learning result of the plurality of learning results.

Figure 3:
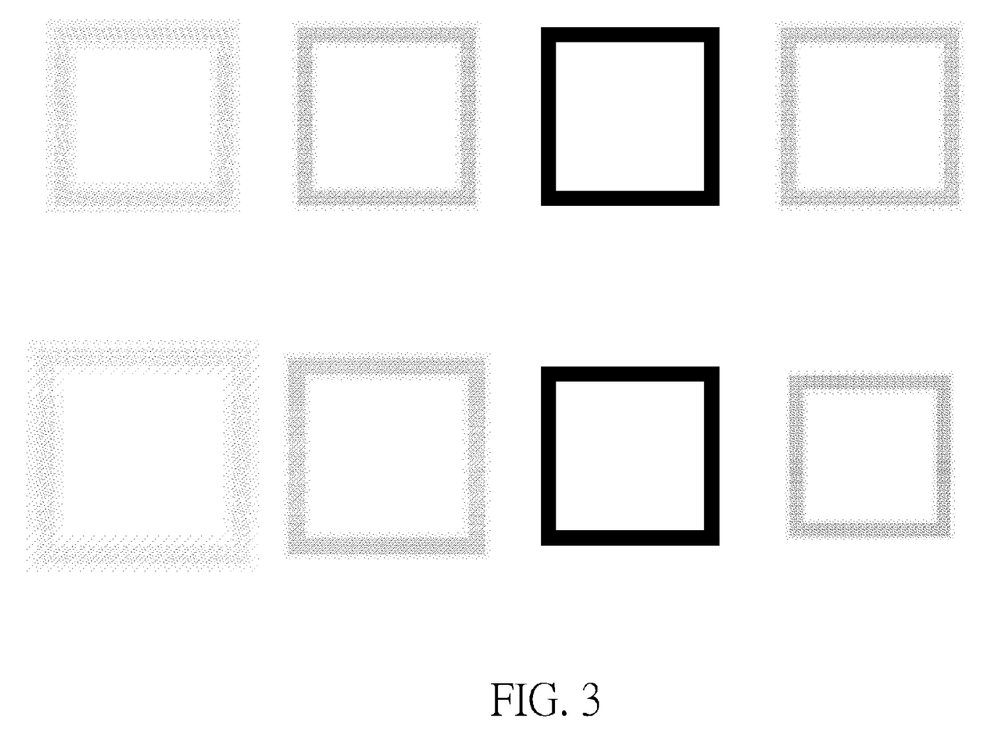
FIG. 3 illustrates the visual effect of a scale-invariant control scheme according to an embodiment of the present invention.

FIG. 3 illustrates the visual effect of a scale-invariant preview control scheme according to an embodiment of the present invention. During an autofocus procedure, these preview images may have two visual effects, one is the 'blur effect', and another one is the 'scaling effect'. The 'blur effect' can be represented by different widths of object contour lines, and the 'scaling effect' can be represented by resizing the object. The upper row of preview images in FIG. 3 shows the scale-invariant results (with the 'blur effect' only) that are obtained from the scale-invariant preview control scheme, and the lower row of preview images in of FIG. 3 shows the scale-variant results of the conventional autofocus procedure (with both of the 'blur effect' and the 'scaling effect'). For better comprehension, a square printed on a test chart can be taken as an example of the same video object that is shown in the two rows of preview images shown in FIG. 3.

Within the preview images in the upper row of preview images shown FIG. 3, the first preview image (i.e. the leftmost preview image in this row) is not clear, the second preview image (i.e. the one next to the leftmost preview image in this row) is clearer, the third preview image (i.e. the one next to the rightmost preview image in this row) is correctly focused and clearest, and the fourth preview image (i.e. the rightmost preview image in this row) is not so clear again because of far away from the focus position in the opposite direction. In addition, the apparatus 100 may control the upper row of preview images to be displayed in the scale-invariant manner or the quasi-scale-invariant manner. As a result, the size of the video object (e.g. the square printed on the test chart) shown in any preview image of the upper row of preview images looks the same as that of the video object shown in any other preview image of the upper row of preview images. Regarding the conventional autofocus procedure, the degree of clearness of a preview image in the lower row of preview images may be similar to that of a preview image in the upper row of preview images. However, the conventional architecture of the related art typically controls the lower row of preview images to be displayed in a scale-variant manner. As a result, the size of the video object (e.g. the square printed on the test chart) shown in any preview image of the lower row of preview images is different from that of the video object shown in any other preview image of the lower row of preview images. For example, during the conventional autofocus procedure, the size of the video object decreases as shown in the lower row of preview images, and the user's visually annoyed feeling is caused thereby.

According to this embodiment, in a situation where the preview images mentioned in Step 230 are obtained and processed by the apparatus 100, the apparatus 100 may process the preview images according to the scale-invariant preview control scheme involved with the method shown in FIG. 2. More particularly, the image resize module 130 may perform the resize operations on the preview images according to the resize parameters, respectively, to control the preview images to be displayed in the scale-invariant manner. As a result, all of the preview images may have the same image contents, except that at least one portion (e.g. a portion or all) of the preview images, may be not clear enough due to failure of imaging.

Please note that, as the preview images can be displayed in the scale-invariant manner, the method 200 and the associated apparatus 100 can bring better user experience to the user, where the related art problems can be prevented.

Figure 4:
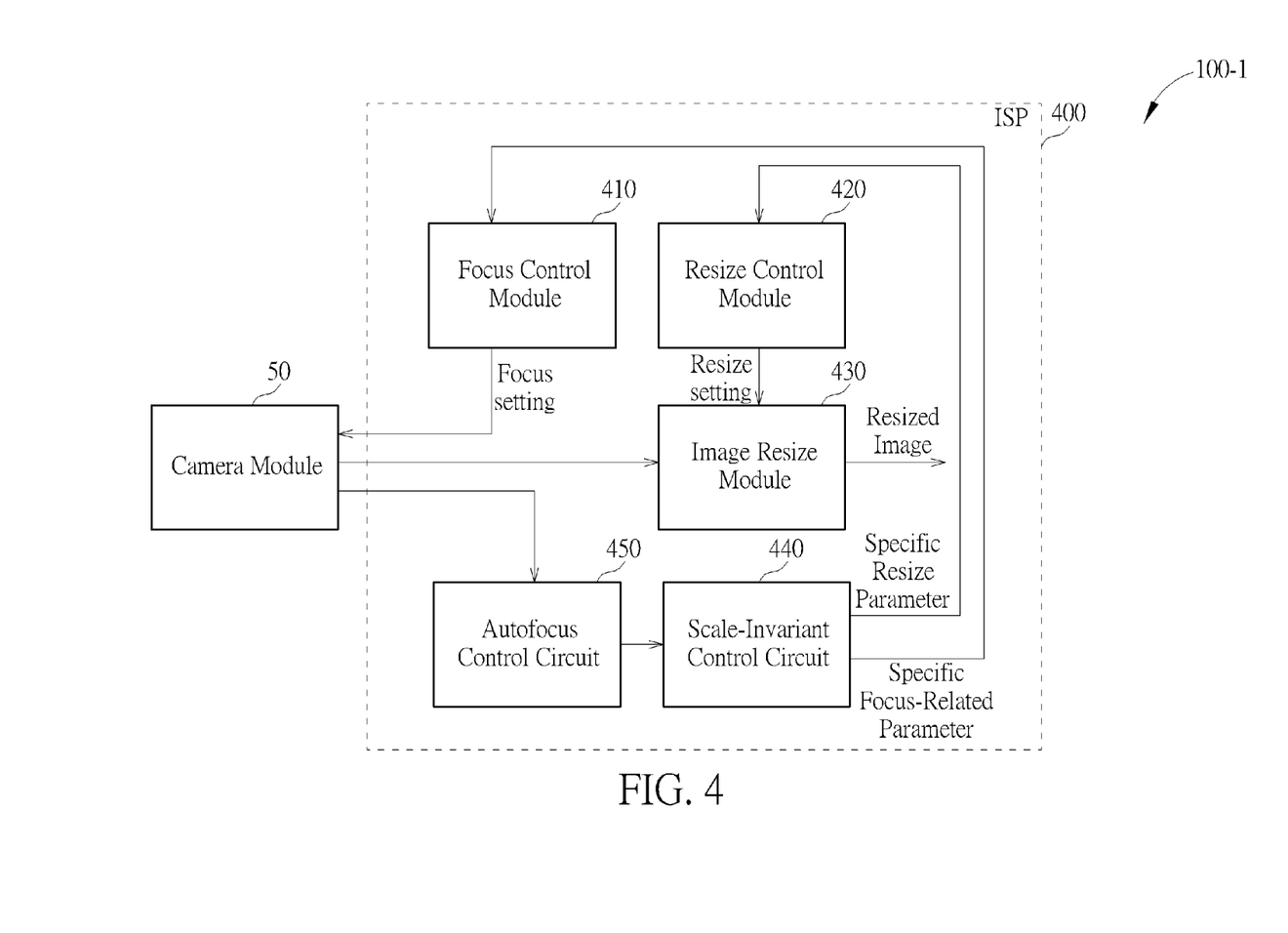
FIG. 4 illustrates an image signal processor (ISP) involved with the method shown in FIG. 2 according to an embodiment of the present invention.

FIG. 4 illustrates an ISP (Image Signal Processor) 400 involved with the method 200 shown in FIG. 2 according to an embodiment of the present invention, where the ISP 400 can be taken as an example of the ISP mentioned in some embodiments described between the embodiments respectively shown in FIG. 1 and FIG. 2.

As shown in FIG. 4, the ISP 400 may comprise an image resize module 430, a focus control module 410, a resize control module 420, an autofocus control circuit 450, and a scale-invariant control circuit 440, and may further comprise an autofocus statistics module (not shown) integrated into the autofocus control circuit 450.

The autofocus control circuit 450 is arranged for autofocus process, i.e. searching the best focus setting from the focus statistics of the preview images to obtain the best sharp image. Particularly, during the process of the autofocus control circuit 450, the scale-invariant control circuit 440 generates the specific focus-related parameter, wherein the statistic focus result is generated from the autofocus statistics module. In addition to the specific focus-related parameter, the scale-invariant control circuit 440 determines a specific resize parameter corresponding to the specific preview image according to a predetermined relationship between the specific resize parameter and the specific focus-related parameter.

The flow diagram shown in FIG. 4 can be referred to as an example of the embodiments respectively shown in FIG. 1 and FIG. 2. For example, the focus control module 410 can be taken as an example of the focus control module 110, and the scale-invariant control circuit 440 can be taken as an example of the scale-invariant control circuit 140. The apparatus 100-1 shown in FIG. 4 can be taken as an example of the apparatus 100 shown in FIG. 1, where the apparatus 100-1 of this embodiment may comprise the whole of the electronic device mentioned above. For brevity, similar descriptions for this embodiment are not repeated in detail here.

Figure 5:
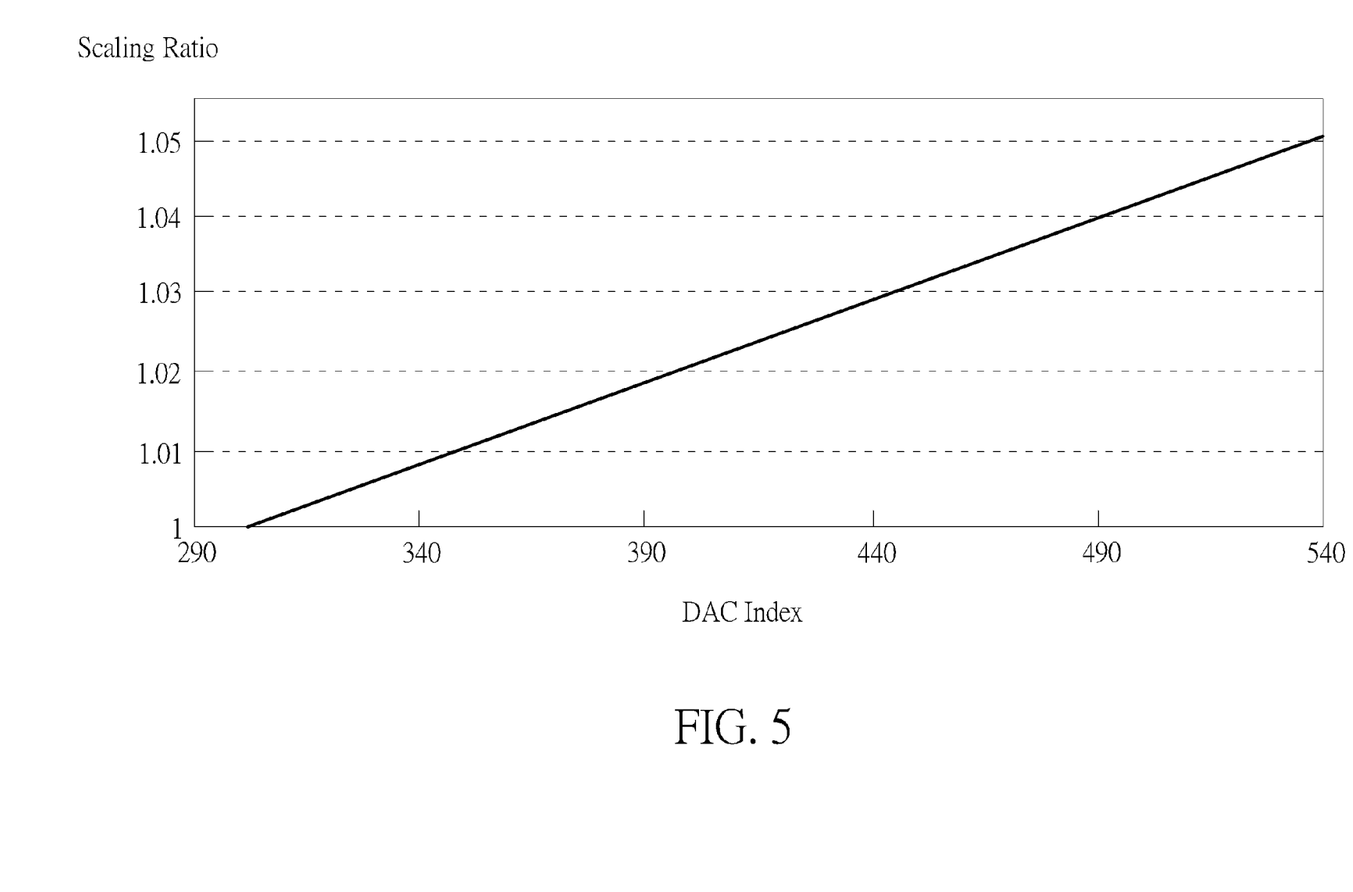
FIG. 5 illustrates a set of predetermined relationships involved with the method shown in FIG. 2 according to an embodiment of the present invention.

FIG. 5 illustrates a set of predetermined relationships involved with the method 200 shown in FIG. 2 according to an embodiment of the present invention, where the function indicated by the curve shown in FIG. 5 comprises the set of predetermined relationships, i.e. the predetermined relationships between the coordinate values of the resizing ratio and the coordinate values of the DAC indexes (more particularly, the digital values to be applied to the DAC mentioned above).

According to this embodiment, the horizontal axis may correspond to the focus-related parameters, and the vertical axis may correspond to the resize parameters. Please note that the set of predetermined relationships in this embodiment, such as the points on the curve shown in FIG. 5, can be taken as an example of the predetermined relationships, where a specific predetermined relationship within the set of predetermined relationships in this embodiment, such as a specific point on the curve shown in FIG. 5, can be taken as an example of the predetermined relationship between the specific resize parameter and the specific focus-related parameter in Step 220. In practice, the curve shown in FIG. 5 can be obtained by measuring the resizing ratios of the set of preview images (e.g. the aforementioned multiple preview images that are different from the preview images mentioned in Step 230), such as the ratio of the size of a specific object of preview images to the size of the same specific object in a reference preview image.

Figure 6:
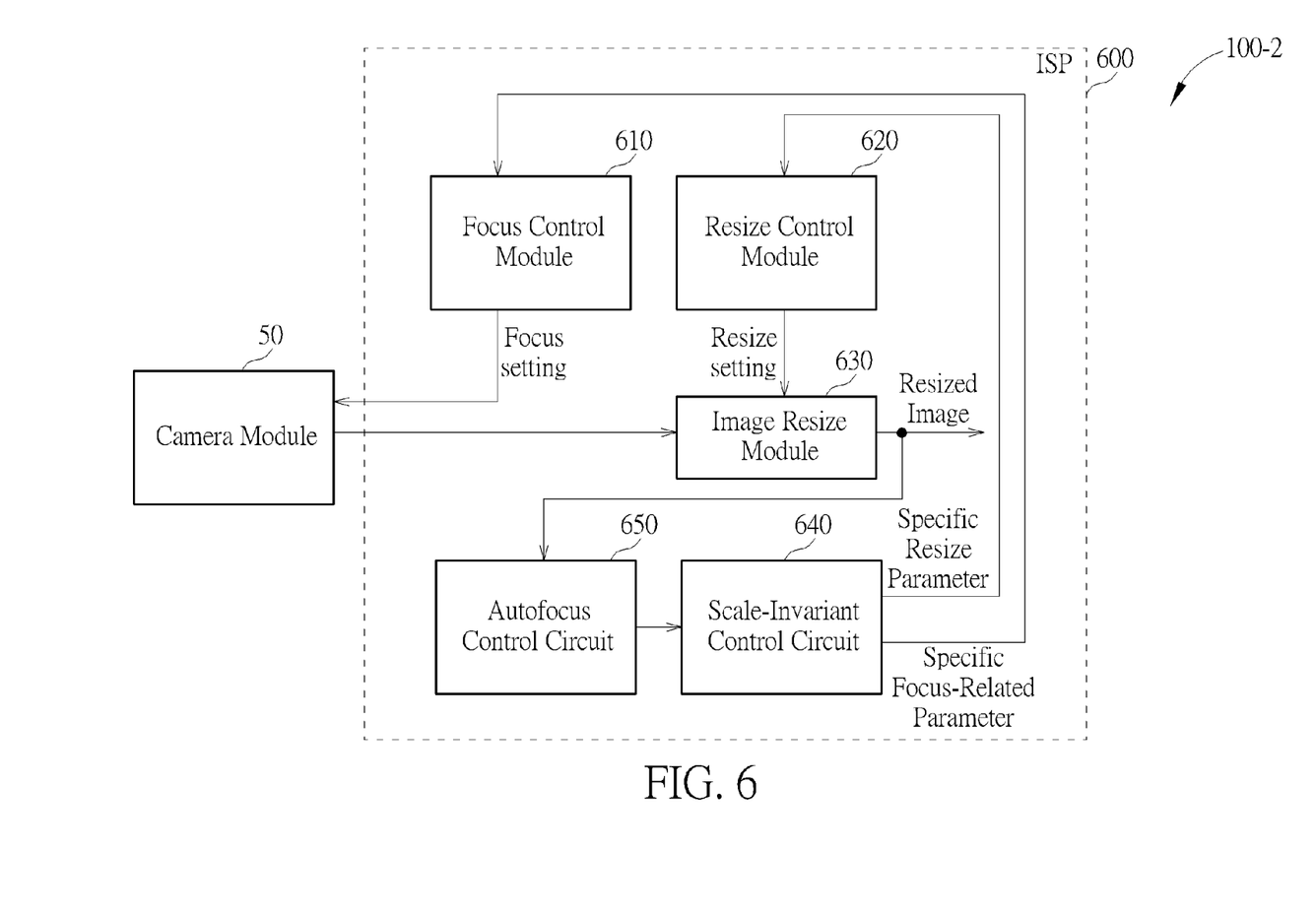
FIG. 6 illustrates an ISP involved with the method shown in FIG. 2 according to another embodiment of the present invention.

FIG. 6 illustrates an ISP 600 involved with the method 200 shown in FIG. 2 according to another embodiment of the present invention, where the ISP 600 can be taken as an example of the ISP mentioned in some embodiments described between the embodiments respectively shown in FIG. 1 and FIG. 2.

As shown in FIG. 6, the ISP 600 may comprise a focus control module 610, a resize control module 620, an image resize module 630, a scale-invariant control circuit 640, and an autofocus control circuit 650, and may further comprise an autofocus statistics module (not shown) integrated into the autofocus control circuit 650. FIG. 4 and FIG. 6 have different implementations of ISP. For the ISP 400, the autofocus statistics module within the autofocus control circuit 450 processes the images from the camera module 50 first, and then the image resize module 430 follows to process thereafter. But for the ISP 600, the image resize module 630 processes the images from the camera module 50 first, and then the autofocus statistics module within the autofocus control circuit 650 follows to process thereafter.

The related diagram of FIG. 6 can be referred to as an example of the embodiments respectively shown in FIG. 1 and FIG. 2. For example, the focus control module 610 can be taken as an example of the focus control module 110, and the scale-invariant control circuit 640 can be taken as an example of the scale-invariant control circuit 140. The apparatus 100-2 shown in FIG. 6 can be taken as an example of the apparatus 100 shown in FIG. 1, where the apparatus 100-2 of this embodiment may comprise the whole of the electronic device mentioned above. For brevity, similar descriptions for this embodiment are not repeated in detail here.

Figure 7:
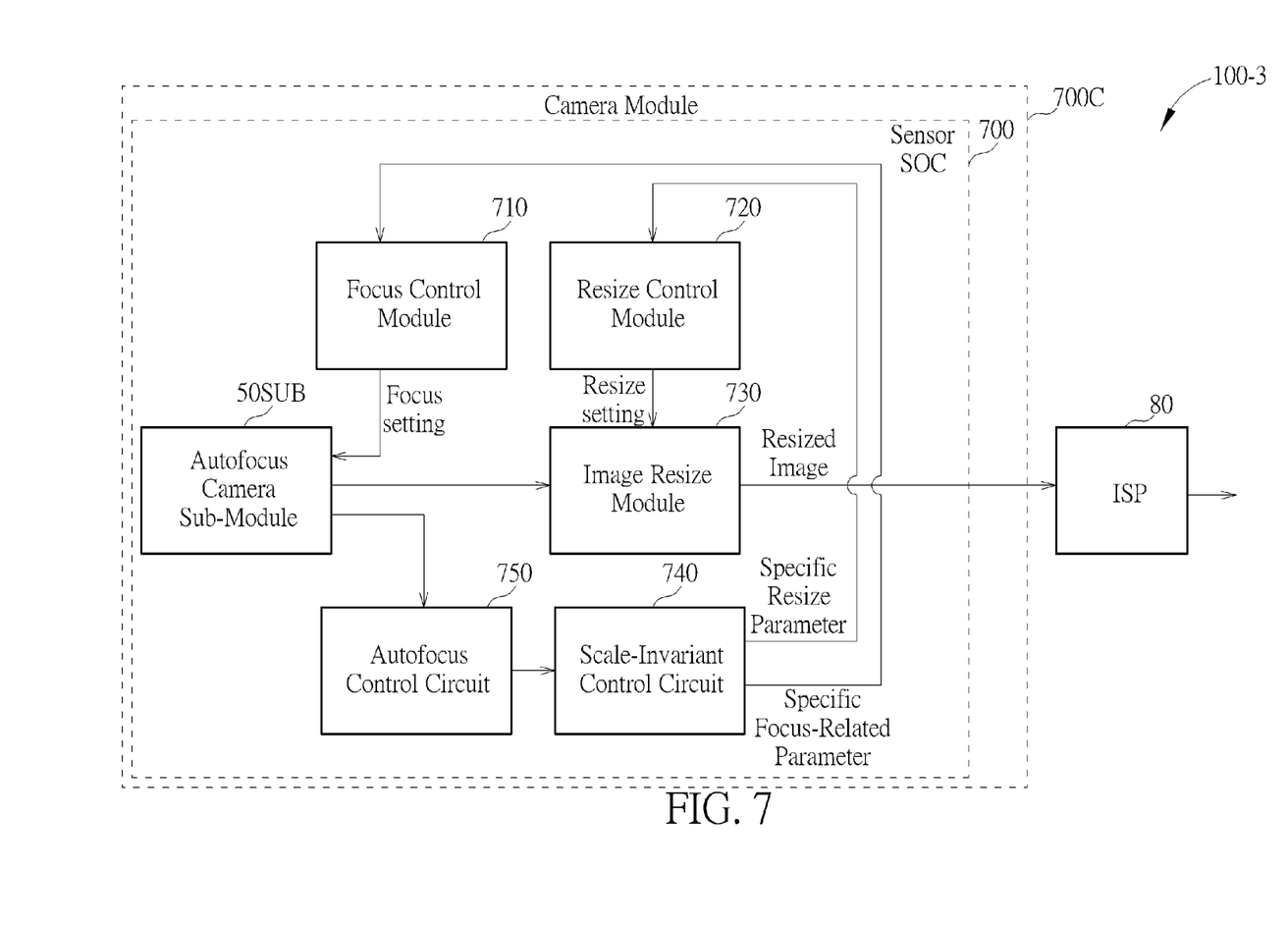
FIG. 7 illustrates a sensor system on chip (SOC) architecture involved with the method shown in FIG. 2 according to another embodiment of the present invention.

FIG. 7 illustrates a sensor system on chip (SOC) architecture 700 (labeled "Sensor SOC" in FIG. 7, for brevity) involved with the method 200 shown in FIG. 2 according to another embodiment of the present invention, where the sensor SOC architecture 700 can be taken as an example of the image sensor with the focus control module 110, the resize control module 120, and the image resize module 130 being integrated into the image sensor as mentioned in some embodiments described between the embodiment shown in FIG. 1 and the embodiment shown in FIG. 2.

As shown in FIG. 7, the sensor SOC architecture 700 may comprise a focus control module 710, a resize control module 720, an image resize module 730, a scale-invariant control circuit 740, and an autofocus control circuit 750, and may further comprise an autofocus statistics module (not shown) integrated into the autofocus control circuit 750, and may further comprise an autofocus camera sub-module 50SUB, where the autofocus camera sub-module 50SUB may comprise at least one image sensor array and the associated image sensor control circuits, and may comprise a driving circuit of the motor of this embodiment, and the DAC mentioned can be integrated into the driving circuit of this embodiment. Based on the arrangement shown in FIG. 7, the camera module 700C of this embodiment may comprise the sensor SOC architecture 700, (e.g. the motor driven by the driving circuit), and the lens unit mentioned in some of the above embodiments.

Please note that the autofocus statistics module integrated into the autofocus control circuit 750 of this embodiment is coupled between the autofocus camera sub-module 50SUB and the image resize module 730. Further, in a situation where all of the focus control module 110, the resize control module 120, the image resize module 130, and scale-invariant control circuit 140 shown in FIG. 1 are integrated into the image sensor of the camera module 50 shown in FIG. 1, the camera module 700C can be taken as an example of the camera module 50. As shown in FIG. 7, the apparatus 100-3 may comprise the camera module 700C, and may further comprise an ISP 80 arranged for performing image processing.

The related diagram shown in FIG. 7 can be referred to as an example of the embodiments respectively shown in FIG. 1 and FIG. 2. For example, the focus control module 710 can be taken as an example of the focus control module 110, and the scale-invariant control circuit 740 can be taken as an example of the scale-invariant control circuit 140. For example, in a situation where all of the focus control module 110, the resize control module 120, the image resize module 130, and scale-invariant control circuit 140 shown in FIG. 1 are integrated into the image sensor of the camera module 50 shown in FIG. 1, the apparatus 100-3 shown in FIG. 7 can be taken as an example of the apparatus 100 shown in FIG. 1, where the apparatus 100-3 of this embodiment may comprise the whole of the electronic device mentioned above. For brevity, similar descriptions for this embodiment are not repeated in detail here.

Figure 8:
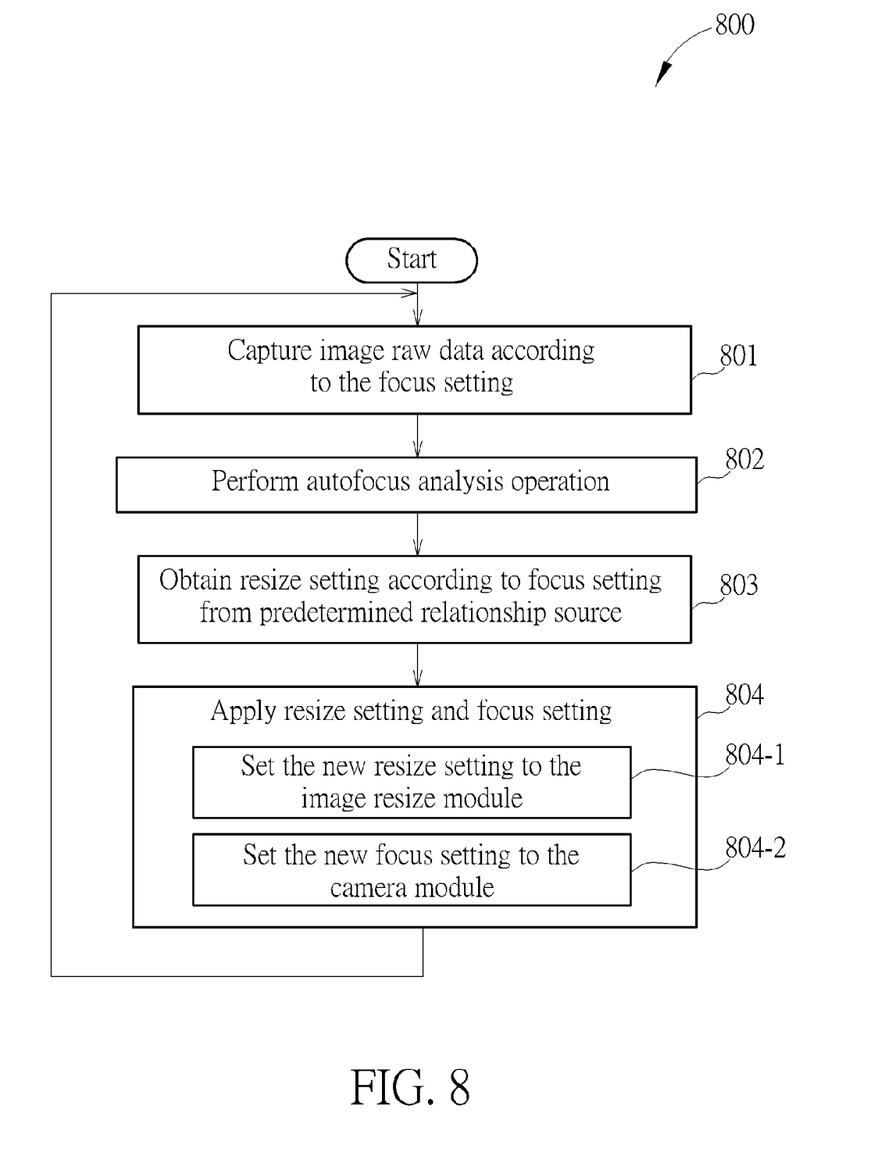
FIG. 8 illustrates a working flow involved with the method shown in FIG. 2 according to an embodiment of the present invention.

FIG. 8 illustrates a working flow 800 involved with the method 200 shown in FIG. 2 according to an embodiment of the present invention, where the working flow 800 can be applied to the apparatus 100-1 shown in FIG. 4.

In Step 801, the camera module 50 (e.g. an autofocus camera module) captures image raw data according to the focus setting such as the DAC index. For example, the initial value of the DAC index can be set as a default value. More particularly, the initial value of the DAC index can be the value corresponding to a hyper-focus plane.

In Step 802, the autofocus statistics module integrated into the autofocus control circuit 450 performs an autofocus analysis operation such as a focus value (FV) analysis operation. For example, the autofocus control statistics circuit 450 (or the autofocus statistics module therein) may obtain the associated FV of the image raw data mentioned in Step 801 from the FV analysis, where the associated FV may indicate the focus quality of the image having the image raw data, and therefore may indicate whether this image is clear or not.

In Step 803, the resize control module 420 obtains the resize setting according to the focus setting from a predetermined relationship source (e.g. a mapping function of the predetermined model mentioned above, or a LUT such as that mentioned above).

In Step 804, the resize control module 420 and the focus control module 410 apply the resize setting and the focus setting, respectively.

In Step 804-1, the resize control module 420 sets the new resize setting to the image resize module 430. As a result, the image resize module 430 resizes the image according to the resize setting.

In Step 804-2, the focus control module 410 sets the new focus setting to the camera module 50 (e.g. the autofocus camera module mentioned in Step 801).

After the operations of Step 804 are performed, Step 801 is re-entered. For brevity, similar descriptions for this embodiment are not repeated in detail here.

Figure 9:
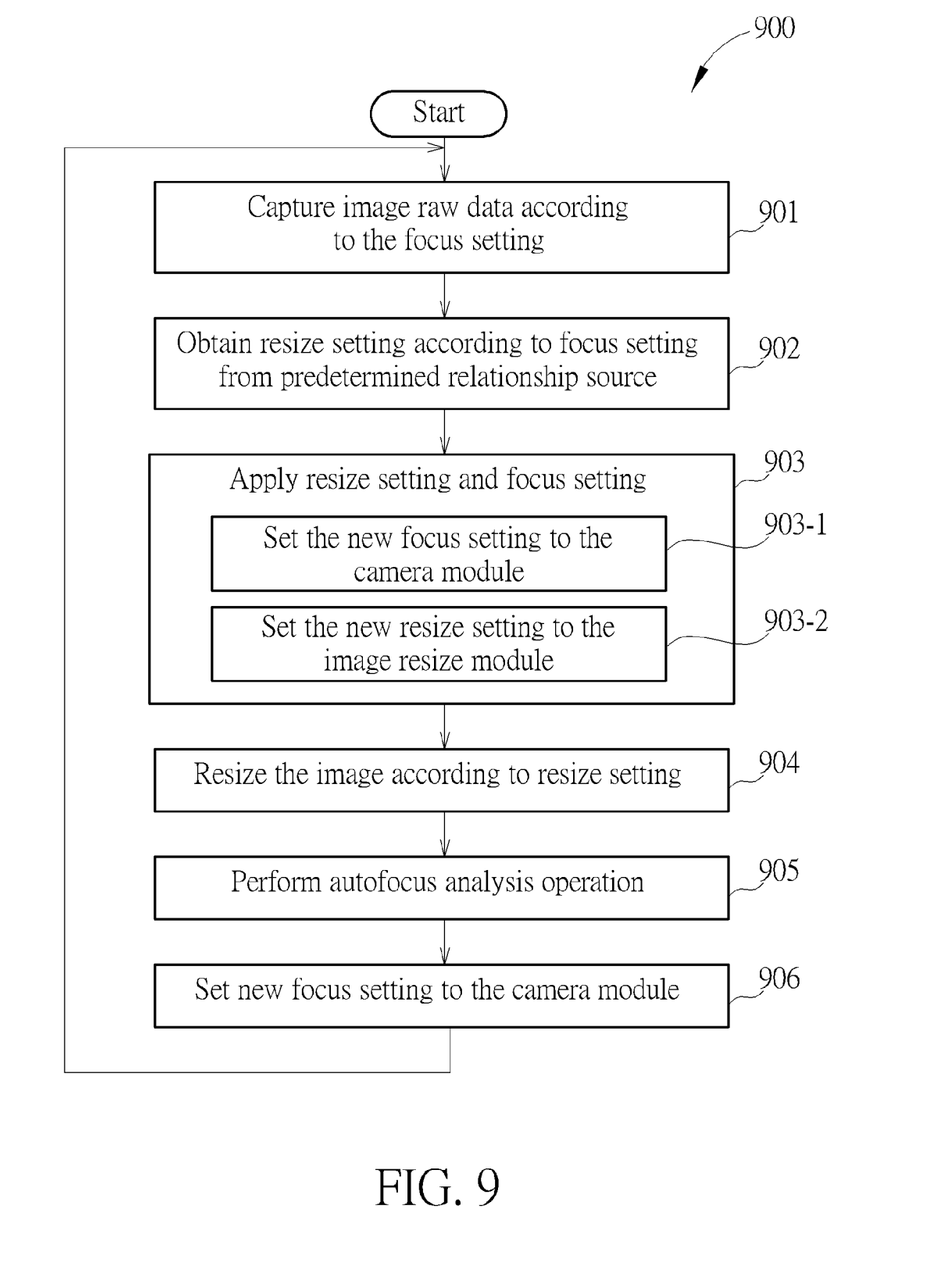
FIG. 9 illustrates a working flow involved with the method shown in FIG. 2 according to another embodiment of the present invention.

FIG. 9 illustrates a working flow 900 involved with the method 200 shown in FIG. 2 according to another embodiment of the present invention, where the working flow 900 can be applied to the apparatus 100-2 shown in FIG. 6.

In Step 901, the camera module 50 (e.g. an autofocus camera module such as that mentioned above) captures image raw data according to the focus setting such as the DAC index. For example, the initial value of the DAC index can be set as a default value. More particularly, the initial value of the DAC index can be the value corresponding to a hyper-focus plane.

In Step 902, the resize control module 620 obtains the resize setting according to the focus setting from a predetermined relationship source (e.g. a mapping function of the predetermined model mentioned above, or a LUT such as that mentioned above).

In Step 903, the resize control module 620 and the focus control module 610 apply the resize setting and the focus setting, respectively.

In Step 903-1, the focus control module 610 sets the new focus setting to the camera module 50 (e.g. the autofocus camera module mentioned in Step 901).

In Step 903-2, the resize control module 620 sets the new resize setting to the image resize module 630.

In Step 904, the image resize module 630 resizes the image according to the resize setting.

In Step 905, the autofocus statistics module integrated into the autofocus control circuit 650 performs an autofocus analysis operation such as an FV analysis operation. For example, the autofocus control circuit 650 (or the autofocus statistics module therein) may obtain the associated FV of the image raw data mentioned in Step 901 from the FV analysis, where the associated FV may indicate the focus quality of the image having the image raw data, and therefore may indicate whether this image is clear or not.

In Step 906, the focus control module 610 sets a new focus setting to the camera module 50 (e.g. the autofocus camera module mentioned in Step 901).

After the operation of Step 906 is performed, Step 901 is re-entered. For brevity, similar descriptions for this embodiment are not repeated in detail here.

As mentioned in some embodiments described between the embodiment shown in FIG. 2 and the embodiment shown in FIG. 3, the resize control module 120 may obtain the aforementioned predetermined relationship between the specific resize parameter and the specific focus-related parameter from the LUT. For example, in one of these embodiments, the LUT can be a mapping table such as that shown below:

| DAC index | 10 | 20 | 30 | 40 | ... | 490 | 500 |
|---|---|---|---|---|---|---|---|
| Resizing ratio | 1.000 | 1.000 | 1.001 | 1.002 | ... | 1.095 | 1.100 | where the notation " ... " in this table may represent some columns of data that are omitted since there are many. Please note that the DAC index in this table can be the same as that in the embodiment shown in FIG. 5, and the resizing ratio in this table can be the same as that in the embodiment shown in FIG. 5. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing image control in an electronic device, the method comprising the steps of:
   obtaining a specific image from a camera module of the electronic device, and obtaining a specific focus-related parameter corresponding to the specific image, wherein the specific focus-related parameter is related to focus control of the camera module;
   determining a specific resize parameter corresponding to the specific image according to a relationship between the specific resize parameter and the specific focus-related parameter; and
   performing a resize operation on the specific image according to the specific resize parameter, to control the specific image to be displayed in a scale-invariant manner.

2. The method of claim 1, wherein the specific focus-related parameter is an autofocus control parameter that is utilized for performing autofocus control on the camera module.

3. The method of claim 2, wherein the specific focus-related parameter is a digital value to be applied to a digital-to-analog converter (DAC), and the DAC is positioned on a control path of the camera module.

4. The method of claim 1, further comprising controlling the specific image to be recorded in the scale-invariant manner.

5. The method of claim 1, wherein a plurality of images are displayed in the scale-invariant manner; and the method further comprises:
   obtaining a plurality of focus-related parameters corresponding to the images respectively, wherein the focus-related parameters comprises the specific focus-related parameter; and
   determining a plurality of resize parameters corresponding to the images according to a plurality of relationships between the resize parameters and the focus-related parameters respectively, wherein the resize parameters comprises the specific resize parameter.

6. The method of claim 5, wherein for an object that is shown in both of a displayed version of the specific image and a displayed version of another image of the images, a size of the object is invariant.

7. The method of claim 6, wherein for the object that is shown in both of the displayed version of the specific image and the displayed version of the other image, a position of the object is invariant.

8. The method of claim 5, further comprising:
   performing a plurality of resize operations on the images according to the resize parameters, respectively, to control the images to be displayed in the scale-invariant manner.

9. The method of claim 1, further comprising:
   obtaining the relationship between the specific resize parameter and the specific focus-related parameter from a look up table (LUT).

10. The method of claim 1, further comprising:
obtaining the relationship between the specific resize parameter and the specific focus-related parameter from a model according to a set of data.

11. The method of claim 10, further comprising:
obtaining the set of data from a look up table (LUT).

12. The method of claim 1, further comprising:
performing a plurality of learning operations according to a set of other images, to generate a plurality of learning results, respectively; and
obtaining the relationship between the specific resize parameter and the specific focus-related parameter from a model according to a specific learning result of the learning results.

13. The method of claim 12, further comprising:
obtaining a plurality of user inputs from a user interface (UI) of the electronic device, wherein the user inputs corresponds to the set of other images, respectively;
wherein the step of performing the learning operations according to the set of other images to generate the learning results respectively further comprises:
performing the learning operations according to the set of other images and according to the user inputs, to generate the learning results respectively.

14. An apparatus for performing image control in an electronic device, the apparatus comprising at least one portion of the electronic device, the apparatus comprising:
a focus control module, arranged for controlling the apparatus to obtain a specific image from a camera module of the electronic device, and obtaining a specific focus-related parameter corresponding to the specific image, wherein the specific focus-related parameter is related to focus control of the camera module;
a resize control module, coupled to the focus control module, arranged for determining a specific resize parameter corresponding to the specific image according to a relationship between the specific resize parameter and the specific focus-related parameter; and
an image resize module, coupled to the resize control module, arranged for performing a resize operation on the specific image according to the specific resize parameter, to control the specific image to be displayed in a scale-invariant manner.

15. The apparatus of claim 14, wherein the resize control module is integrated into the focus control module.

16. The apparatus of claim 14, wherein the focus control module, the resize control module, and the image resize module are positioned within an image signal processor (ISP); and the ISP is coupled to the camera module.

17. The apparatus of claim 14, wherein the focus control module comprises an autofocus control circuit arranged for performing autofocus control of the camera module; and the apparatus further comprises:
an autofocus statistics module, coupled between the camera module and the image resize module, and further coupled to the autofocus control circuit, arranged for performing a plurality of autofocus statistics operations on a plurality of images to generate a plurality of autofocus statistics results respectively.

18. A method for performing image control in an electronic device, the method comprising the steps of:
obtaining a specific image from a camera module of the electronic device, and obtaining a specific focus-related parameter corresponding to the specific image, wherein the specific focus-related parameter is related to focus control of the camera module;
determining a specific resize parameter corresponding to the specific image according to a relationship between the specific resize parameter and the specific focus-related parameter; and
performing a resize operation on the specific image according to the specific resize parameter, to control the specific image to be displayed in a quasi-scale-invariant manner, wherein the quasi-scale-invariant manner represents that an image scale difference between the specific image and another image falls within a range.

19. The method of claim 18, wherein the specific focus-related parameter is a digital value to be applied to a digital-to-analog converter (DAC), and the DAC is positioned on a control path of the camera module.

20. The method of claim 18, wherein a plurality of images are displayed in the quasi-scale-invariant manner; and the method further comprises:
obtaining a plurality of focus-related parameters corresponding to the images respectively, wherein the focus-related parameters comprises the specific focus-related parameter; and
determining a plurality of resize parameters corresponding to the images according to a plurality of relationships between the resize parameters and the focus-related parameters respectively, wherein the resize parameters comprises the specific resize parameter.

* * * * *